United States Patent

[11] 3,633,364

| [72] | Inventors | Karl Haide<br>Friedrichshafen;<br>Walter Schweizer, Immenstaad, both of Germany |
|------|-----------|---|
| [21] | Appl. No. | 13,728 |
| [22] | Filed | Feb. 24, 1970 |
| [45] | Patented | Jan. 11, 1972 |
| [73] | Assignee | Motoren-und Turbinen-Union Friedrichshafen GmbH |
| [32] | Priority | Mar. 8, 1969 |
| [33] | | Germany |
| [31] | | P 19 11 879.7 |

[54] HYDRODYNAMIC TRANSMISSION WITH CONSTANT POWER INPUT
3 Claims, 4 Drawing Figs.

[52] U.S. Cl................................................... 60/54
[51] Int. Cl........................................................ F16d 31/06
[50] Field of Search............................................ 60/54

[56] References Cited
UNITED STATES PATENTS

| 3,169,371 | 2/1965 | Kugel............................ | 60/54 |
| 2,145,006 | 1/1939 | Fichtner........................ | 60/54 |
| 2,213,349 | 9/1940 | Seibold......................... | 60/54 |

*Primary Examiner*—Edgar W. Geoghegan
*Attorney*—Craig, Antonelli & Hill

ABSTRACT: A hydrodynamic transmission, especially for railway motor cars in which the torque converter or torque converters for the lower velocity range include a turbine with centrifugal flow and the torque converter or torque converters for the upper velocity range include a turbine with axial or centripetal flow.

HYDRODYNAMIC TRANSMISSION WITH CONSTANT POWER INPUT

The present invention relates to a hydrodynamic transmission with at least two circulatory systems adapted to be engaged and disengaged, preferably torque converters, for example, for railway motor cars.

Hydrodynamic transmissions of this type have the purpose to match the torque made available by the driving engine, for example, by a Diesel engine, to the requirements of the railway motor car. This matching is to take place over the entire operating range with as good as possible a transmission efficiency at as constant as possible a power input and engine rotational speed. For this purpose, several hydrodynamic circulatory systems adapted to be engaged and disengaged, preferably torque converters, are provided, whereby each circulatory system operates in a partial range of the entire velocity range.

In all those cases in which the turbine rotational speed of a torque converter increases in the normal operating range above the pump or impeller rotational speed, an increase of the power input of the pump occurs approximately at the point of exceeding the rotational speed equality with the types of torque converter constructions utilized heretofore in these transmissions. This increase of the power input has its origin in the increasing oil circulation in the torque converter, caused by the increasing turbine rotational speed.

For the most part, the torque converter for the upper output rotational speed range is affected thereby and more particularly always when the range of the torque converter has to be driven out far, i.e., has to be utilized to a larger extent. This is the case if only few torque converters are present for the entire velocity range and, on the one hand, a high starting torque is required while, on the other, a high maximum velocity is also demanded.

In partial load operation, when the full tractional force is not required and in which the hydrodynamic transmissions have to be driven by a partial rotational speed of the driving engine, the torque converter for the upper velocity range has to be driven out still further in its operating range for achieving the maximum driven rotational speed, i.e., has to be operated with a higher rotational speed ratio of the turbine rotational speed to pump rotational speed than at full load.

Normally, the driving engine is capable of producing the required additional output at the lower rotational speed corresponding to the partial load by a larger filling because the engine power output with a complete filling and with decreasing engine rotational speed does not drop back as pronouncedly as the transmission input power.

With highly supercharged Diesel engines, however, where the filling has to be limited at middle engine rotational speeds because of the smoke limit, and since auxiliary devices necessary for the railroad operation require a constant additional engine load over the entire engine rotational speed range, the engine output power no longer suffices if the transmission requires an increased power.

The object of the present invention resides in so constructing the torque converters of the transmission that as constant as possible a power input is achieved over the entire range of use also at partial load operation.

The underlying problems are solved according to the present invention in that the torque converter or converters for the lower velocity range include a conventional turbine with centrifugal flow therethrough and that the torque converter or torque converters for the upper velocity range include conventional turbines with axial or centripetal flow therethrough.

As a result of the turbine of the torque converter for the upper driven rotational speed range which now operates in opposition to the pump as regards the oil-circulation quantity, an approximately constant power input of the pump also of this torque converter and therewith of the transmission is achieved.

An advantageous type of construction is realized in that the pump wheels of all torque converters are coordinated to a hollow shaft which is driven from the transmission input shaft by way of a speedup gear whereas the turbine wheels of the torque converters are arranged on the central shaft, and in that the torque converters for the upper velocity range include rotating housings and the pump wheels or turbine wheels of these torque converters are secured to this housing.

As a result of the rotating housing of the torque converter with the turbine provided with centripetal or axial flow therethrough, a constructively simple design and construction of the guide wheel mounting and fastening of this torque converter is achieved.

These and further objects, features, and advantages of the present invention will become more obvious from the following description when taken in connection with the accompanying drawing which shows, for purposes of illustration only, one preferred embodiment of the present invention, as well as the torque converter and engine characteristics, and in which FIG. 1 is a diagram illustrating the characteristics of the power input of a torque converter including a turbine with a centrifugal flow therethrough;

Figure 1:
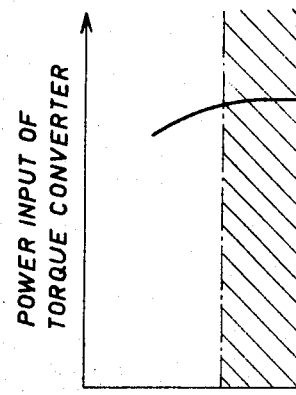

Referring now to the drawing, and more particularly to FIG. 1, the input power of a torque converter having a turbine with centrifugal flow therethrough on the part of the hydraulic medium, is illustrated, for a constant pump or impeller rotational speed, against the ratio of turbine rotational speed: pump-rotational speed.

The cross-hatched area represents the normally utilized range of the torque converter. In this range, the input power is practically constant. Below this range, the transmission is operated in another torque converter operation. The transmission is normally so constructed and designed that this constant power input corresponds to the maximum output of the engine at the rated rotational speed of the engine and that the rated speed of the vehicle is reached at operation with full engine output and maximum attached load at the end of the cross-hatched area. With a smaller attached load, the rated speed can be reached with a smaller power output. In order that the hydraulic transmission accepts a smaller power, it has to be driven with a lower rotational speed. At the rated velocity, the smaller driving rotational speed produces a larger ratio of turbine rotational speed to pump rotational speed. As a result thereof, one reaches the range of increasing power input.

This increase of the torque converter power input, however, is undesirable because the highly supercharged Diesel engines predominantly utilized in railroad motor cars, have to be limited at middle and smaller rotational speeds in the filling thereof, conditioned by the inherent characteristics thereof, and therewith have to be limited in the output thereof.

Figure 2:
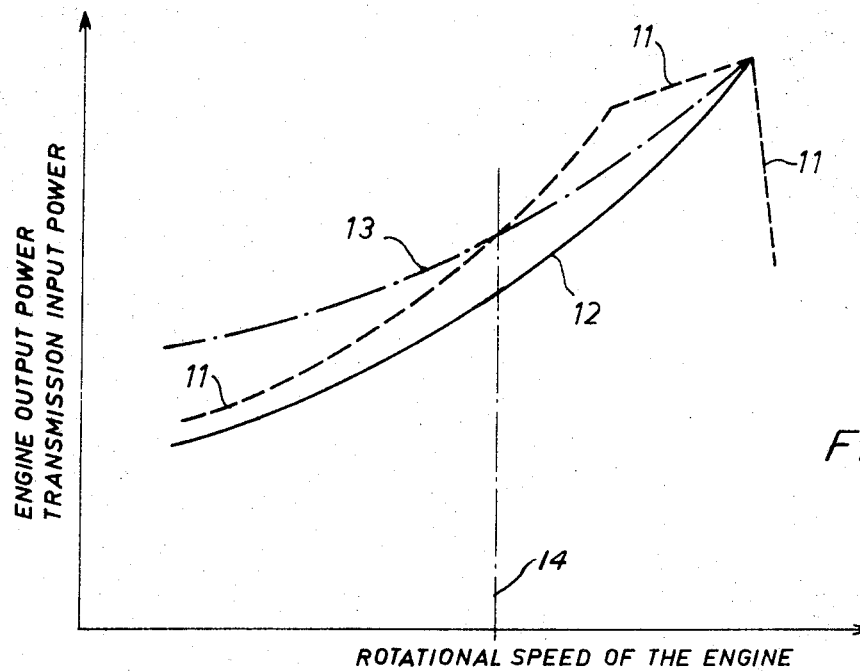
FIG. 2 is a diagram illustrating the output curves of a highly supercharged Diesel engine and of a hydrodynamic transmission.

FIG. 2 illustrates the effect of the increasing power input in conjunction with a highly supercharged Diesel engine. Curve 11 represents the power output curve of the Diesel engine. Curve 12 illustrates the correct power input of the transmission in the cross-hatched area of FIG. 1, i.e., at rotational speed ratios of the torque converter wherein the pump and turbine rotational speed are approximately the same. This power input is dependent on the third power of the engine rotational speed. Additionally, an amount of power for an auxiliary device, which is constant over the engine rotational speed, is contained in this power input. Curve 13 illustrates the characteristics of the input power when at smaller engine rotational speeds, i.e., therefore at partial load, one drives at full driven rotational speed, i.e., at the rated velocity. With smaller engine rotational speeds and therewith with a smaller partial load step, the power excess of the engine becomes increasingly smaller until at the rotational speed 14, the power input of the transmission inclusive the constant amount of power for the auxiliary device reaches the power supply of the engine, i.e., the power output made available by the engine. An operation below this engine rotational speed is not possible. Either one has to drive at a lower driven rotational speed or the power requirement for the auxiliary device has to be reduced.

Figure 3:
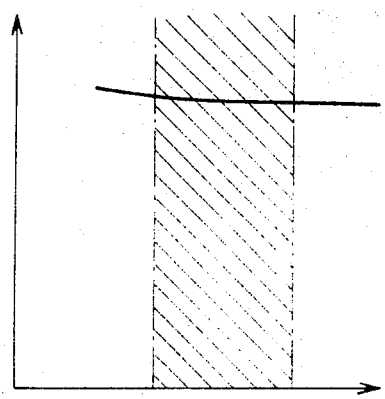
FIG. 3 is a diagram illustrating the characteristics of the power input of a torque converter including a turbine with centripetal flow therethrough.

FIG. 3 illustrates the curve of the power input of a torque converter having a turbine with centripetal flow therethrough on the part of the hydraulic medium. In that case, the engine is always loaded in the manner as it is able to give off power and is not overloaded even in the partial load operation. One obtains for this torque converter also at higher rotational speeds of the turbine with respect to the pump the favorable curve 12 in FIG. 2.

Figure 4:
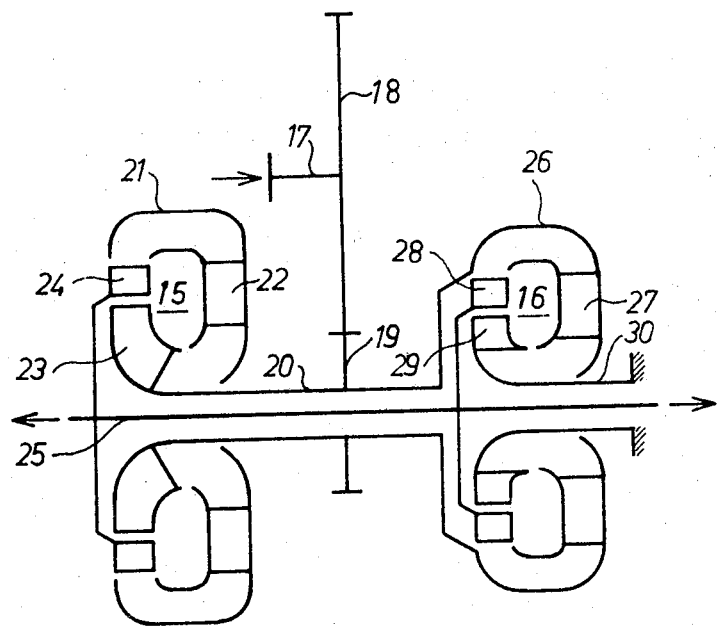
FIG. 4 is a schematic view of the torque converters of a two-torque converter transmission in accordance with the present invention.

FIG. 4 illustrates schematically a transmission with two torque converters 15 and 16 in accordance with the present invention.

The torque converter 15 is coordinated to the lower velocity range while the torque converter 16 is coordinated to the upper velocity range. The engine (not shown) drives the pump wheel shaft 20 constructed as hollow shaft by way of a conventional jointed shaft (not shown), the transmission input shaft 17 and the speedup gears 18 and 19.

The torque converter 15 for the lower velocity range consists of the fixed housing 21 with the guide wheel 22, of the pump wheel 23 which is directly secured on the pump wheel shaft 20, and of the turbine wheel 24 with centrifugal flow of the hydraulic medium therethrough which is arranged on the central turbine shaft 25.

The torque converter 16 for the upper velocity range consists of the housing 26 connected with the pump wheel shaft 20 and rotating in unison with this shaft, at which is secured the pump wheel 27, of the turbine wheel 28 with centripetal flow of the hydraulic medium therethrough which is connected with the central turbine shaft 25, and of the fixed guide wheel 29 which is mounted by means of a tubular member 30 to the transmission housing (not shown).

The central turbine wheel shaft 25 is the output shaft of the hydraulic transmission. Depending on the requirements, a mechanical speed reduction gear or a reversing gear may be connected in the output of the hydraulic transmission. Since the controls of the transmission including the controls of the torque converters are conventional, a detailed description and showing thereof is dispensed with herein.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

1. A hydrodynamic transmission with at least two torque converters adapted to be effectively engaged and disengaged, characterized by torque converter means for the lower velocity range including turbine means with centrifugal flow therethrough, and torque converter means for the upper velocity range including turbine means with centripetal flow therethrough.

2. A hydrodynamic transmission according to claim 1, characterized in that the transmission is driven from a supercharged Diesel engine for driving the wheels of a railway motor car.

3. A transmission according to claim 1, characterized in that said torque converter means includes pump wheel means, the pump wheel means of all torque converter means being coordinated to a pump wheel shaft constructed as a hollow shaft which is driven from a transmission input shaft by way of a speedup gearing means whereas the turbine wheel means of the torque converter means are arranged on a central turbine wheel shaft, and in that the torque converter means for the upper velocity range includes rotating housing means and one of the wheels consisting of the pump wheels and turbine wheel means of said last-mentioned torque converter means is secured at the housing means.

* * * * *